Nov. 10, 1953  U. GATTI  2,658,436
ROTARY PLOW
Filed July 16, 1947  2 Sheets-Sheet 1

INVENTOR
UBALDO GATTI
BY Otto Munk
HIS ATT'Y

Nov. 10, 1953   U. GATTI   2,658,436
ROTARY PLOW
Filed July 16, 1947   2 Sheets-Sheet 2

INVENTOR
UBALDO GATTI
BY Otto Munk
HIS ATTY

Patented Nov. 10, 1953

2,658,436

UNITED STATES PATENT OFFICE 2,658,436

ROTARY PLOW

Ubaldo Gatti, Leghorn, Italy

Application July 16, 1947, Serial No. 761,383

Claims priority, application Italy August 1, 1946

3 Claims. (Cl. 97—38)

As is universally known, a plough cuts through the ground by means of forward-moving wedges with variously shaped cutters, which wedges turn the furrow-slice and throw it on one side, leaving it almost intact, so that after ploughing one must proceed to break up the clods and level the ground, as is also well known, by the use of a harrow.

The device that is the object of the present specification concerns the provision for a complete preparation of the ground by means of a single operation that provides for the breaking up and aeration of the soil, which is thus left level and ready for sowing as if use had been made of the harrow. It is also possible, according to this system, to perform the operations of fertilizing the ground, and further of sowing the seed, at the same time as the ploughing is carried out, by the simple addition of suitable parts.

Essentially the system comprises one or more members which rotate about an horizontal axis axis that is parallel to the direction of travel, these members being, for example, in the nature of milling cutters which may, for instance, be pointed or provided with screws with one or more blades.

These members, when set ready for work, are arranged in a position that is below the level of the ground, means being in any event provided to transmit the rotary speed motion to the said elements along an axis horizontal and parallel to the movement, so that as the vehicle on which the whole is mounted moves forward, the work of turning and breaking up the clods is carried out in the ground.

Means are provided to vary both the working depth of the revolving parts and their reciprocal transverse distance in the case of their being more than one working member.

Means are likewise provided to enable the vehicle to move on the road, when it is not in working phase; and means for simultaneously fertilizing the ground and, if desired, for sowing the seed may be combined with the aforesaid vehicle.

The revolving members may be either driven by an independent motor or be run straight from the mechanical device providing the forward motion, or again, from the axis of the carrying wheels in the case of the vehicle's being driven by animal or mechanical means.

The members, that is to say the revolving implements, whether pointed or with screws with one or more blades, may in practice advantageously number two or three at least, and should be arranged on different planes of rotation, so that the working zone of each implement cuts in the working zone of another, so as to avoid interruption of continuity in working; the implements might also be all on the same plane.

The device in question is susceptible to an application that will allow the ground to be worked simultaneously across a very wide front, without the force of traction being increased beyond such limits as are admissible having regard to adherence to the ground.

This further application consists in arranging a number of trucks, each provided with rotary members, suitably arranged in single file perpendicular to the direction of the movement. These trucks are more or less rigidly joined together and united by tie-rods and rods to the means of traction, more particularly a mechanical means from which the power is derived for the revolving members.

When travelling on the road the trucks are each joined one behind the other, so as to form a jointed train drawn by the mechanical means mentioned above.

The device will be understood both essentially and in detail from the descriptive text that follows hereinafter together with the accompanying drawings which show, in a purely schematic manner, a few examples of the practical application of the device; it seems that preference may be given to these examples, but they must in no case be considered the only ones possible.

Figure 7:
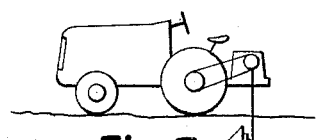
Figure 2:
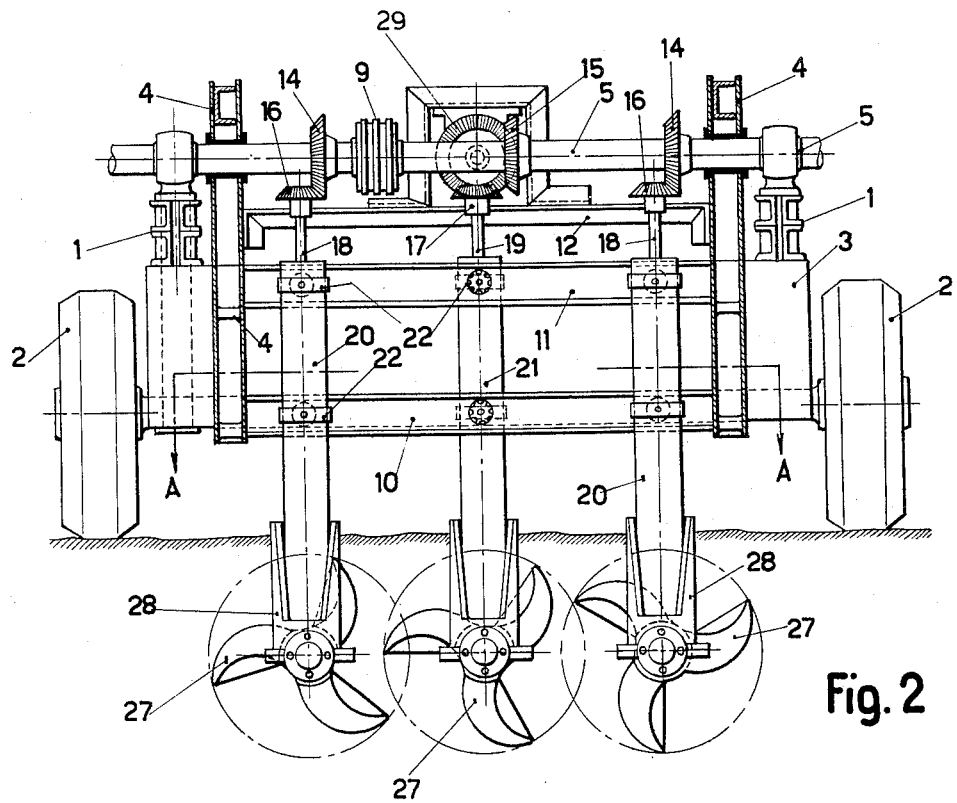
Fig. 2 shows a rear view partly in section of the assembly shown in Fig. 1.

Fig. 7, a further scheme of transmitting the movement to the revolving implement.

As may be seen in the example illustrated in Figs. 1 to 7 inclusive, the device consists of a truck 1 with, for example, three wheels 2—2 two of which, the back wheels, are arranged to pivot on the solid cross-beam 3. At the back of the truck two panels 4—4 are provided, which pivot on a horizontal shaft 5 that is set in rotation by the driving mechanism 6 through a suitable reducer 7 and a flexible transmission 8, which last is wound on to a pulley 9 keyed onto the shaft 5.

The side-panels 4—4 are joined together by means of metal cross-bars 10—11—12—13 fixed in a suitable manner, soldered, for example, or riveted, to the said panels.

The shaft 5 according to the example carries three bevel gears 14—14—15 which engage, more or less directly, with the bevel pinions 16—16—17 mounted on a corresponding number of vertical axes 18—18—19.

Each of the said shafts is journalled on a suitable bushing supported by a tubular bearing 20—20—21, the latter being, for example, triangular in section.

Figure 3:
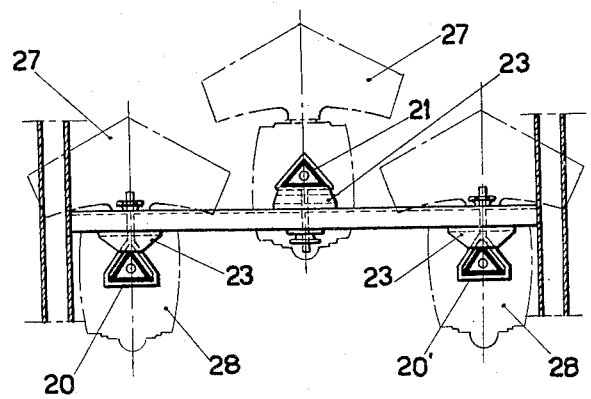
Fig. 3 is a partial section along the line A—A of Fig. 2.

These supports are joined to the cross-bar 10—11 by suitably shaped bolts 22, which keep the bearings 20—20—21 firmly secured, by means of suitable spacers 23—23 (see also Fig. 3).

The lower end of each of the shafts 18—18—19 terminates in a bevel pinion 24 which transmits the movement through the pinion 25 to the horizontal axis 26 onto which the revolving implement 27 is keyed.

The transmission 24—25 and the shaft 26 are supported by a member 28 in which they are enclosed; the object of this member is to protect the bevel coupling and bushes of the shaft 26 from the intrusion of earth or foreign bodies. Suitable packing gives protection against lubricant leakage and the intrusion of earth into the thrust and supporting bearings of the relative rotating member or implement 27. As the support 21 lies forward in relation to the two supports 20—20 the gear wheel 15 of the shaft 5 does not mesh directly with the pinion 17, but with a gear wheel 29 with double bevel teeth mounted on the axle 30 and meshing with the second set of teeth with the said pinion 17 (see particularly Fig. 4).

Figure 4:
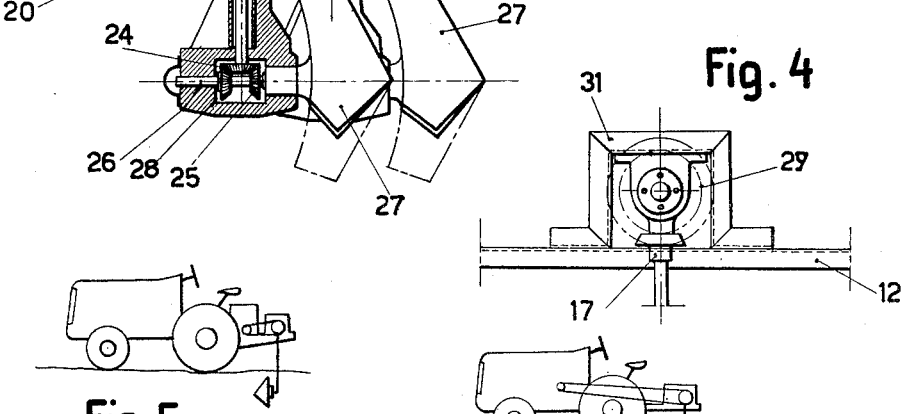
Fig. 4 is also a schematic section, along the line B—B of Fig. 1.

The shaft 30 is opportunely sustained by a support 31 resting on the cross-bar 12 (see also Fig. 4).

The revolving implement 27 may be shaped like a drilling-tool, that is to say it may be pointed with screws having one or more blades, or be of any other form suitable for penetrating the ground and mixing and crumbling the soil.

Means (not shown), such as pivots and anchorage flukes, are provided on the truck 1, these means being suited to fix the swinging panels 4—4 alternatively in both working and free-running positions; for example this result might be achieved by flexible metal stay rods suitably arranged and driven.

Figure 1:
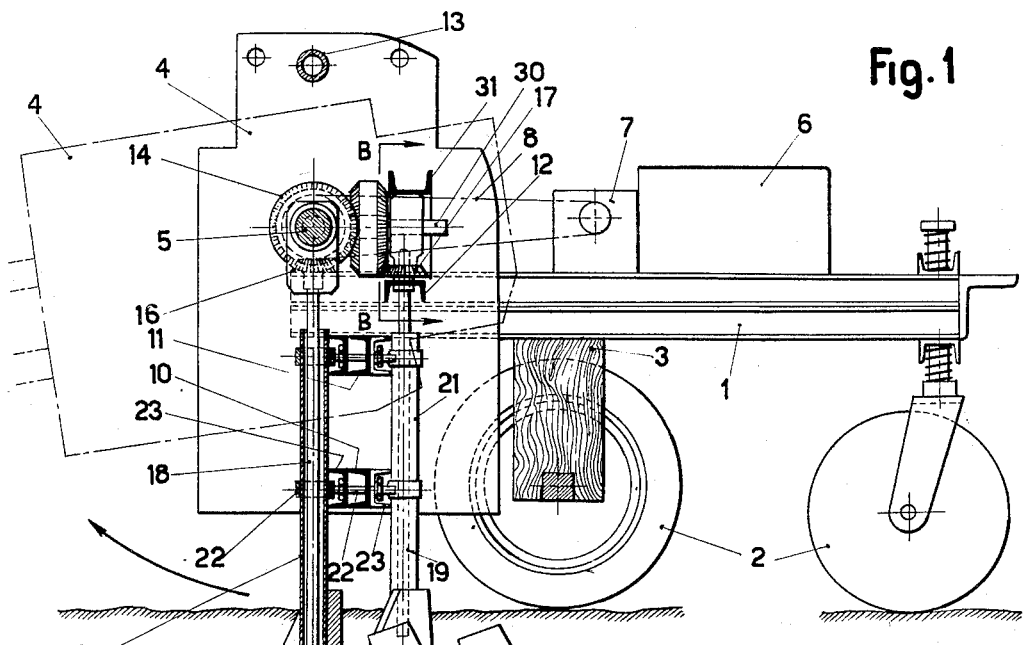
Fig. 1 shows a whole truck provided with the device in question, partly in section, in working position, a dotted line showing the position taken by the device when running free.

The working of the device described in the example illustrated above is as follows: the truck is brought to its field of work in free-running position—that is with panels 4 in the position shown by the dotted lines in Fig. 1; the engine 6 is then set going and the rotary movement of the shaft 5 is begun through the gear box 7, the flexible element 8 and the pulley 9. The movement is thus transmitted through the pair of gears 14—16 to the shafts 18—18 and through the wheels 15—29—17 to the shaft 19; this is unaffected by the position of the panels 4.

From the shafts 18—18—19 the rotary movement is transmitted at a suitable speed, to the members 27 through the pair of gears 24—25.

When the panels 4 are lowered round the shaft 5 in working position, the shafts 18—18—19 are brought into vertical position, or at all events suitably inclined, and the members or implements 27 proceed to penetrate directly into the ground and begin to work the soil; this operation is then continued horizontally as the machine moves forward.

A piece or strip of land is thus obtained that is worked completely, since the parts or members 27 are, in this case, three and so arranged that each cuts into the working zone of another.

If single strips of prepared land should be required, each worked by a separate implement, the central implement may be omitted; or the two lateral implements may be moved further to the sides so as to increase the distance between the separate working zones; this may be done by changing the position of the bolts 23 provided that a sliding contact coupling is possible for the gear wheels 14—14, in addition to suitable means of fixing them in position on the shaft 5.

Such an arrangement may be embodied as desired and is not shown in the drawing.

It is likewise possible to vary the depth of the cut, that is to say the position of the rotating implements 27 in relation to the surface of the ground, by providing a coupling for the bevel pinions 16—16—17 similar to the one described above.

In this case the vertical displacements are controlled by varying the position of the triangular supports 20—20—21 in relation to the cross-bars 10—11.

A suitable space between the shaft 5 and the upper ends of the shafts 18 is provided for this purpose.

The rotary movement of the screw blades besides being provided by an auxiliary motor, as in the example described above, may be obtained by making use of the rotation of the wheels carrying the truck, the latter progressing mechanically or by animal traction.

Figure 5:
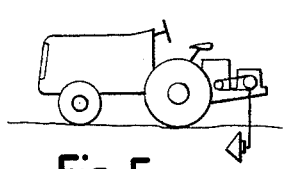
Fig. 5 shows a scheme for transmitting the movement to the revolving implement.

Fig. 5 shows schematically the position of the device when mounted directly on the mechanical means and with an independent motor for the rotation of the implements.

Figure 6:
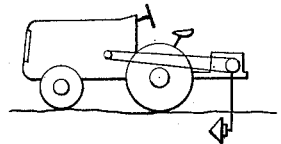
Fig. 6 shows another scheme for the same transmission.

In the diagram in Fig. 6 the rotary movement is derived directly from the traction motor; while in Fig. 7 the movement is derived from the driving gears.

It is evident that the examples quoted above only constitute schematic forms which are given solely as a practical demonstration of the invention, which invention may vary in form and arrangements without thereby going beyond the limits of the inventive idea.

Angle transmission with screws or helicoidal wheels or the like might naturally also be employed, in addition to bevel gear transmissions.

The machine might be provided with two or more series of screws arranged to overlap and possibly offset so that the machine could be used for deep ground-breaking; means also being contemplated for removing the material from the finished zone and placing it on one side.

Fertilization can be carried out with a suitable receptacle placed high up on the truck. At the bottom of the receptacle a suitable organ, an Archimedian screw for example, may be provided, before the inlet tubes, which will chop up the manure and convey it to the vertically placed tubes.

The fertilization pipes may be provided with a transparent peep-hole in a suitable position for controlling the flow of the said elements.

One form of the three-bladed-screw members inclined at an angle of 22° 30′ seems to prove the most advisable, since when it has been given suitable speed in relation to the forward movement (travel), it can break the ground up into minute particles, and crush it finely, even when the ground to be prepared is still wet.

This form however is by no means binding and is only offered as an example; it may, in fact, assume any other suitable shape, especially as regards the drilling point, according to the nature of the ground and the type of work to be carried out.

Weeds are found to be chopped up most efficaciously by this system.

The apparatus might be provided with a suitable device by means of which one of the bladed drills might be suitably placed so as to cut a vertical or almost vertical hole of the depth desired and equal in diameter to the drill employed. This will be found most useful for making tests of soil, setting up piling or planting trees with thick trunks, prospecting for water, and so on.

The advantages and results of this system are evident.

It is obvious that a greater total traction stress is required by a wedge—such as a plough—in order for it to advance through the ground than by a twist or simple drill when set in rotation: the stress required for translation and working is thus lessened, and consequently the power of the driving organ.

The working of the screw drills results in the ground being so much better intermixed that the further consequent work of breaking up the clods produced by the normal plough is not required.

It allows the ground to be worked and deeply fertilized at the same time, whether with mineral fertilizers, stable manure or the liquid residue from the cess pool.

It may possibly also allow sowing to be performed simultaneously. When work is finished with the machine, the ground will be well broken up, intermingled and levelled with a consequent saving of the usual further work of breaking the clods and levelling the ground with the harrow.

It is evident that the number, shape, diameter, depth and reciprocal position of the drills may be increased, lessened or varied according to the power available and to the length or depth of the work to be done.

In the case of simultaneous ploughing and fertilizing, the fertilizer, as has been said above, is injected into the soil immediately behind and still disturbed by the revolving member and therefore thoroughly well mixed into the ground.

In the case of simultaneous sowing, the seed is injected at the due regulated depth into the ground which is re-levelled at the same time; the dropping of the seed may take place immediately after the screw drill and the fertilizer injector.

The fact of its being possible to inject the fertilizer deep into the soil leads to its fertilizing properties being exploited to the utmost, and the advantages deriving from the seed being sown by means that place it at the desired depth, such, for example, as tubes for dropping the seed and blades so arranged as to open out the soil. The seed is thus immediately re-covered with fresh worked and fertilized soil.

By the application of suitable cutters behind the drilling points (keeping only one point working, or else two or more points, but with a suitable distance between them) a regular channel may be cut out, or several channels either near together or at a distance one from another. In this channel (or channels) pipes, for example, may be laid (and would find a perfect housing therein) or water or other liquids may be run, seeing that the drilling point traces a smooth, uniform, perfect furrow.

Having now particularly described and ascertained the nature of my said invention and in what manner the same is to be performed, I declare that what I claim is:

1. A machine for the working of the soil, of the type wherein a plurality of tools are arranged on several discrete transverse planes and each rotates around an horizontal axis parallel to the direction of advance of the machine, said machine including a single transverse shaft for transmission of motion to said plurality of tools, a plurality of bevel gears located upon said transverse shaft, corresponding similar gears meshing with certain of said bevel gears for the transmission of motion to said tools on one of said transverse planes, an assembly including a double bevel gear meshing with another of said bevel gears on said transverse shaft for the transmission of the motion to the tools arranged on a different transverse plane and a frame, bearing said tools and pivotally mounted on said transverse shaft, in order to transmit the motion to the tools, in any position assumed by the frame.

2. A machine for the working of the soil, according to claim 1, also comprising supports and substantially vertical shafts, for the transmission of the motion to the tools, said supports being secured to the frame and rotating therewith around the transverse shaft, and having bolts applicable at variable positions thereof.

3. A machine for the working of the soil according to claim 1, including a towing motor for advancing the machine and a motor for imparting motion to the tools, said last motor being independent from the towing motor.

UBALDO GATTI.

References Cited in the file of this patent

UNITED STATES PATENTS

| Number | Name | Date |
|---|---|---|
| 605,631 | Dallmann | June 14, 1898 |
| 658,459 | Nubar | Sept. 25, 1900 |
| 736,279 | Lorenz | Aug. 11, 1903 |
| 987,171 | Riester | Mar. 21, 1911 |
| 1,119,862 | Nilson | Dec. 8, 1914 |
| 1,198,589 | Shellaberger | Sept. 19, 1916 |
| 1,365,192 | Petit | Jan. 11, 1921 |
| 1,506,042 | Bauer | Aug. 26, 1924 |
| 1,619,797 | Martikainen | Mar. 1, 1927 |
| 1,824,098 | Patzschke | Sept. 22, 1931 |
| 2,088,141 | Royston | July 27, 1937 |
| 2,095,417 | Messersmith et al. | Oct. 12, 1937 |

FOREIGN PATENTS

| Number | Country | Date |
|---|---|---|
| 543,115 | France | Aug. 28, 1922 |